United States Patent Office.

PHILIP MARQUARDT, OF BUFFALO, NEW YORK.

Letters Patent No. 100,304, dated March 1, 1870.

IMPROVEMENT IN THE MANUFACTURE OF POTTERY, &c.

The Schedule referred to in these Letters Patent and making part of the same.

*To all whom it may concern:*

Be it known that I, PHILIP MARQUARDT, of Buffalo, in the county of Erie, and State of New York, have invented certain new and useful Improvements in the Composition and Manufacture of Pottery, &c., of which the following is a specification.

Nature of Invention.

The object of this invention is to produce a species of pottery for family vessels, &c., or that can be used for artifical stone for ornamental purposes, &c., that will stand fire, and which resembles porcelain, but is porous, and consists, as I believe, in a new and better combination of component parts, of which the following is a description.

I make a silicate of lime and alumina by dissolving one (1) pound of alum (sulphate of alumina and potash) in six times its weight of hot water. I sift into this solution powdered carbonate of lime (chalk-Paris white) until saturated and all action ceases, the result being a precipitate of carbonate of alumina and sulphate of lime.

I then add soluble glass, one (1) pint, composed of flint one (1) part, soda and potash one (1) part, by weight, and fused and dissolved in the usual manner, and evaporated to a specific gravity of 1—5, causing another decomposition, the gelatinous silica combining with the lime and alumina, the sulphuric acid with the soda and potash, forming sulphate of soda and potash, which is dissolved out by water, leaving silicate of lime and alumina. This is then ground and evaporated to the required consistency to be molded in various forms.

The articles made, when dry, are burnt or vitrified in a potter's kiln to the required hardness, when the same are ready for market.

The result of this compound is cheaper and better than porcelain, which it resembles, of a handsome color, and very durable.

It is better than porcelain for certain purposes, (being porous,) such as vessels for holding water on stoves, flower-pots, &c.

It has another great advantage, for, by adding ground flint, in quantities to suit, to the above-described compound, the product is a beautiful light-colored stone, which can be molded into any form and hardened, making an artificial stone resembling marble, which could be used for busts, tombstones, and many other appropriate articles, ornamental or otherwise.

What I claim is—

The within clearly-described composition, the parts combined in the manner and proportion, and for the uses and purposes herein set forth.

In witness whereof I have hereunto signed my name in the presence of two subscribing witnesses.

PHILIP MARQUARDT.

Witnesses:
   J. R. DRAKE,
   ALBERT HAIGHT.